(12) United States Patent
Tsutsui et al.

(10) Patent No.: US 10,081,778 B2
(45) Date of Patent: Sep. 25, 2018

(54) GREASE COMPOSITION FOR HUB UNIT BEARING

(71) Applicants: KYODO YUSHI CO., LTD., Fujisawa-shi, Kanagawa (JP); HONDA MOTOR CO., LTD., Minato-ku, Tokyo (JP)

(72) Inventors: Daisuke Tsutsui, Yokohama (JP); Yuta Sato, Fujisawa (JP); Junichi Imai, Fujisawa (JP); Morinobu Kawamura, Wako (JP)

(73) Assignees: KYODO YUSHI CO., LTD., Fujisawa-Shi, Kanagawa (JP); HONDA MOTOR CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 14/439,250

(22) PCT Filed: Oct. 30, 2013

(86) PCT No.: PCT/JP2013/079391
§ 371 (c)(1),
(2) Date: Apr. 29, 2015

(87) PCT Pub. No.: WO2014/069522
PCT Pub. Date: May 8, 2014

(65) Prior Publication Data
US 2015/0299608 A1    Oct. 22, 2015

(30) Foreign Application Priority Data
Oct. 31, 2012   (JP) ................................ 2012-240447

(51) Int. Cl.
*C10M 169/00*   (2006.01)
*C10M 169/02*   (2006.01)
*C10M 169/04*   (2006.01)
*F16C 33/66*    (2006.01)

(52) U.S. Cl.
CPC ........ *C10M 169/02* (2013.01); *C10M 169/00* (2013.01); *C10M 169/04* (2013.01); *F16C 33/6633* (2013.01); *C10M 2205/0285* (2013.01); *C10M 2207/2805* (2013.01); *C10M 2207/2835* (2013.01); *C10M 2215/1026* (2013.01); *C10N 2220/022* (2013.01); *C10N 2230/02* (2013.01); *C10N 2230/06* (2013.01); *C10N 2230/36* (2013.01); *C10N 2240/02* (2013.01); *C10N 2250/10* (2013.01)

(58) Field of Classification Search
CPC .............. C10M 169/00; C10M 169/02; C10M 169/04; C10M 2215/1026; C10M 2207/2835; C10M 2207/2805; C10M 2205/0285; F16C 33/6633; C10N 2240/02; C10N 2230/36; C10N 2230/06; C10N 2230/02; C10N 2250/10; C10N 2220/022

See application file for complete search history.

(56) References Cited

U.S. PATENT DOCUMENTS

| 2004/0242439 | A1* | 12/2004 | Mikami ............... | C10M 169/02 |
| | | | | 508/480 |
| 2013/0170777 | A1* | 7/2013 | Ito ........................ | C10M 169/00 |
| | | | | 384/462 |

FOREIGN PATENT DOCUMENTS

| CN | 101194003 A | 6/2008 | | |
| JP | 6-306383 A | 11/1994 | | |
| JP | 2004-352858 A | 12/2004 | | |
| JP | WO 2006132314 A1 * | 12/2006 | ............. | B60B 27/00 |
| JP | 2010-132746 A | 6/2010 | | |
| JP | WO 2012036076 A1 * | 3/2012 | .......... | C10M 169/00 |
| WO | WO 2012/036076 A1 | 3/2012 | | |

OTHER PUBLICATIONS

International Search Report (PCT/ISA/210) dated Jan. 28, 2014, by the Japanese Patent Office as the International Searching Authority for International Application No. PCT/JP2013/079391.
Written Opinion (PCT/ISA/237) dated Jan. 28, 2014, by the Japanese Patent Office as the International Searching Authority for International Application No. PCT/JP2013/079391.
Ishikawa, "Technical Trends and Tribology of Hub Unit Bearing", 2009, pp. 580-585.
Ishikawa: "Technical Trends and Tribology of Hub Unit Bearing", Journal of Japanese Society of Tribologists, vol. 54, No. 9, 2009, pp. 580-585 (23 pages including English Translation).
Office Action dated Mar. 3, 2016, by the State Intellectual Property Office of China in corresponding Chinese Patent Application No. 201380056398.4 (6 pages).

* cited by examiner

*Primary Examiner* — Taiwo Oladapo
(74) *Attorney, Agent, or Firm* — Buchanan, Ingersoll & Rooney PC

(57) ABSTRACT

The invention provides a grease composition for hub unit bearing, having (a) as a base oil a mixture of a hydrocarbon synthetic oil and an ester type synthetic oil, with the content of the ester type synthetic oil being 20 to 50 parts by mass with respect to 100 parts by mass of the total of the hydrocarbon synthetic oil and the ester type synthetic oil, and the base oil having a kinematic viscosity at 40° C. of 20 to 80 mm$^2$/s, and (b) as a thickener a urea compound.

9 Claims, No Drawings

GREASE COMPOSITION FOR HUB UNIT BEARING

RELATED APPLICATION

This application is a national stage entry of PCT/JP 2013/079391, filed on Oct. 30, 2013 which claims priority of Japanese Patent Application No. 2012-240447, filed Oct. 31, 2012, which are incorporated by reference in their entirety.

TECHNICAL FIELD

The present invention relates to a grease composition for hub unit bearings, having improved low torque characteristics and excellent compatibility with a seal material.

BACKGROUND ART

To promote the measures to prevent global warming by reducing $CO_2$ emissions, a fuel-efficiency standard for the motorcar of 2015 has been formulated based on the Energy Saving Law. The improvement of the fuel efficiency has been thus urgently required. One of the methods for improving the fuel efficiency of the motorcar is to reduce the torque of bearings used for automotive wheels (which will be hereinafter referred to as hub unit bearings).

The hub unit bearings, which are designed for the driving wheel and the follower wheel, can rotatably support a hub ring for fixing the automotive wheel via a double-row rolling bearing. For the structural reasons, the inner ring is generally rotated in the hub unit bearing for driving wheels; and either the inner ring or the outer ring is rotated in that for follower wheels.

The hub unit bearings are roughly divided into four groups: the first generation structure where a bearing for automotive wheel such as a double row angular rolling bearing or the like is fitted into a space between a knuckle for constituting a suspension and a hub ring; the second generation structure where a flange for fixing on a car body or a flange for attaching to a wheel is directly formed on the periphery of the external member; the third generation structure where one of the internal raceways is directly formed on the circumference of the hub ring; and the fourth generation structure where the respective internal raceways are directly formed on the circumference of the hub ring and the circumference of the external joint member of a constant velocity universal joint coupling.

The hub unit bearing is disposed at a portion readily exposed to muddy water and the like. Therefore, a sealing unit such as a seal material is used to tightly seal the space between the external member and the internal member. Typically, nitrile rubber (hereinafter also referred to as NBR) is widely used for the seal material in consideration of the oil resistance, wear resistance, heat resistance, workability, inexpensiveness and the like.

To cope with the reduction of torque in the hub unit bearing, the bearing itself may have various factors to be modified or the composition of grease employed may be changed. For example, one of the representative methods for reducing the torque in terms of the employed grease is to reduce the stirring resistance of the grease by using a base oil with a low kinematic viscosity for the grease composition (Hiroaki Ishikawa "Technical Trends and Tribology of Hub Unit Bearing." Tribologist, vol. 54(9), 2009, pp. 580-585). However, when the kinematic viscosity of the base oil is decreased, there is the problem that satisfactory bearing life cannot be obtained because of deterioration of the oil film under the conditions of high temperatures although the reduction of torque can be achieved.

To solve the above-mentioned problem, base oils with high viscosity indexes, such as hydrocarbon synthetic oils and ester type synthetic oils may be employed to prevent the decrease of viscosity under elevated temperatures.

For the hydrocarbon synthetic oils, however, it is difficult to fully satisfy the bearing life because the heat-resistant stability is slightly poor. The ester type synthetic oils cause the problem that the oils tend to swell the seal material to impair the sealing performance although the heat-resistant stability is excellent (JP 2010-132746 A).

SUMMARY OF INVENTION

Technical Problem

An object of the invention is to provide a grease composition for hub unit bearings, having improved low torque characteristics and excellent durability under the conditions of high temperatures, and also having no adverse effect on any seal material, especially when nitrile rubber (NBR) or the like is used for the seal material.

Solution to Problem

The inventors of the present invention have successfully lowered the torque of the above-mentioned hub unit bearing, improved the bearing life by increasing the heat resistance of grease, and also improved the compatibility of the grease composition with nitrile rubber (NBR) used as the seal material by choosing a mixture of a hydrocarbon synthetic oil and an ester type synthetic oil as the base oil and a urea compound as the thickener in a grease composition. The invention has been accomplished based on the above-mentioned findings. Accordingly, the invention provides the following grease composition:

1. A grease composition for hub unit bearing, characterized by comprising;
(a) as a base oil a mixture of a hydrocarbon synthetic oil and an ester type synthetic oil, with the content of the ester type synthetic oil being 20 to 50 parts by mass with respect to 100 parts by mass of the total of the hydrocarbon synthetic oil and the ester type synthetic oil and the base oil having a kinematic viscosity at 40° C. of 20 to 80 $mm^2/s$, and
(b) as a thickener a urea compound.
2. The grease composition described in the above-mentioned item 1, wherein the kinematic viscosity at 40° C. of the base oil is 30 to 80 $mm^2/s$.
3. The grease composition described in the above-mentioned item 1 or 2, wherein the hydrocarbon synthetic oil is a poly α-olefin and the ester type synthetic oil is a polyol ester.
4. The grease composition described in the above-mentioned item 3, wherein the polyol ester is an ester of trimethylolpropane, pentaerythritol or dipentaerythritol with an aliphatic straight or branched chain monocarboxylic acid having 2 to 36 carbon atoms.
5. The grease composition described in the above-mentioned item 3, wherein the polyol ester is an ester of pentaerythritol with a straight or branched chain fatty acid having 7 to 10 carbon atoms, or an ester of dipentaerythritol with a straight or branched chain fatty acid having 7 to 10 carbon atoms.
6. The grease composition described in any one of the above-mentioned items 1 to 5, wherein the urea compound is represented by the following formula (1):

$$R^1\text{—NHCONH—}R^2\text{—NHCONH—}R^3 \quad (1)$$

wherein $R^1$ and $R^3$, which may be the same or different from each other, each independently represent an aromatic hydrocarbon group having 6 to 12 carbon atoms, cyclohexyl group, or a straight or branched chain alkyl group having 8 to 22 carbon atoms; and $R^2$ is a bivalent aromatic hydrocarbon group having 6 to 15 carbon atoms.

Effects of Invention

The grease composition of the invention can provide excellent sealing stability, low torque characteristics, and long life.

DESCRIPTION OF EMBODIMENTS (a) Base Oil

The base oil used in the invention is a mixed base oil comprising a hydrocarbon synthetic oil and an ester type synthetic oil, with the content of the ester type synthetic oil being 20 to 50 parts by mass with respect to 100 parts by mass of the total of the hydrocarbon synthetic oil and the ester type synthetic oil and the base oil having a kinematic viscosity at 40° C. of 20 to 80 mm²/s. The kinematic viscosity at 40° C. of the base oil may preferably be 30 to 80 mm²/s, and particularly preferably 60 mm²/s. When the kinematic viscosity at 40° C. of the base oil is less than 20 mm²/s, the resultant oil film tends to be thinner. Therefore, a sufficient oil film thickness cannot be ensured, so that the surface may be impaired or the two surfaces between which should be lubricated may come in contact with each other, thereby causing the increase of torque. When the kinematic viscosity at 40° C. of the base oil exceeds 80 mm²/s, the viscosity resistance will increase, and thereby increasing the torque. The term "part(s) by mass" herein used means the ratio of the ester type synthetic oil with respect to 100 parts by mass of the mixture of the hydrocarbon synthetic oil and the ester type synthetic oil unless otherwise specified.

The content of the ester type synthetic oil is 20 to 50 parts by mass, with respect to 100 parts by mass of the hydrocarbon synthetic oil and the ester type synthetic oil in total. When the content of the ester type synthetic oil is less than 20 parts by mass in the base oil, the durability of bearing will deteriorate under elevated temperatures. On the other hand, when the content exceeds 50 parts by mass, the seal material is caused to swell, which may increase the torque applied to the sliding portion of the seal material, and decrease the sealing performance to produce the problem of grease leakage from the bearing.

Examples of the hydrocarbon synthetic oil include any hydrocarbon synthetic oils such as poly α-olefins, polybutenes, ethylene-α-olefin copolymers and the like. One kind of hydrocarbon synthetic oil may be used alone, or two or more kinds of hydrocarbon synthetic oils may be appropriately blended. In particular, poly α-olefins having high viscosity indexes and excellent low-temperature properties are preferable.

Examples of the ester type synthetic oil include any ester type synthetic oils such as monoesters, diesters, polyol esters and complex esters and the like. One kind of ester type synthetic oil may be used alone, or two or more kinds of ester type synthetic oils may be appropriately blended. Of the above, polyol esters are preferable, and in particular, pentaerythritol esters are more preferable because of the excellent low-temperature properties and heat resistance.

Of the above-mentioned polyol esters, esters formed from a neopentyl type polyol such as trimethylolpropane, pentaerythritol, dipentaerythritol or the like with a saturated or unsaturated aliphatic straight or branched chain monocarboxylic acid having 2 to 36 carbon atoms are preferable.

More specifically, preferably used are esters formed from a neopentyl type polyol such as trimethylolpropane, pentaerythritol, dipentaerythritol or the like with an aliphatic straight or branched chain monocarboxylic acid having 2 to 36 carbon atoms, such as n-ethanoic acid, n-propanoic acid, n-butylic acid, n-pentanoic acid, 2-methylpentanoic acid, 2-ethylpentanoic acid, n-hexanoic acid, 2-methylhexanoic acid, 2-ethylhexanoic acid, n-heptanoic acid, n-octanoic acid, n-nonanoic acid, n-decanoic acid, n-undecanoic acid, n-dodecanoic acid, n-tridecanoic acid, n-tetradecanoic acid, n-pentadecanoic acid, n-hexadecanoic acid, n-heptadecanoic acid, n-octadecanoic acid or the like. In particular, an ester of pentaerythritol with a straight or branched chain fatty acid having 7 to 10 carbon atoms, or an ester of dipentaerythritol with a straight or branched chain fatty acid having 7 to 10 carbon atoms is preferable.

The base oil used in the invention may further comprise other base oil components than the hydrocarbon synthetic oil and the ester type synthetic oil. Such a base oil component that can be used with the hydrocarbon synthetic oil and the ester type synthetic oil is not particularly limited. Specifically, a variety of base oil components such as paraffinic mineral oils, naphthenic mineral oils, silicone oils, fluorinated oils and the like may be used together.

The total content of the mixture of the hydrocarbon synthetic oil and the ester type synthetic oil in the base oil may preferably be 50 mass % or more, more preferably 80 to 100 mass %, and most preferably 100 mass %.

(b) Thickener

As the thickener, aromatic diurea compounds or alicyclic aliphatic diurea compounds can be used in the invention. The aromatic diurea compounds or alicyclic aliphatic diurea compounds are commonly used as the thickeners having excellent heat resistance. The compounds represented by the following formula are preferable:

$$R^1-NHCONH-R^2-NHCONH-R^3 \quad (1)$$

wherein $R^1$ and $R^3$ may be the same or different from each other and are each an aromatic hydrocarbon group having 6 to 12 carbon atoms, cyclohexyl group or a straight or branched chain alkyl group having 8 to 22 carbon atoms. Specifically, $R^1$ and $R^3$ may be phenyl group, tolyl group, xylyl group, cumenyl group, t-butyl phenyl group, benzyl group, mesityl group or the like. $R^2$ represents a bivalent aromatic hydrocarbon group having 6 to 15 carbon atoms. The representative examples are those having the following structural formulas:

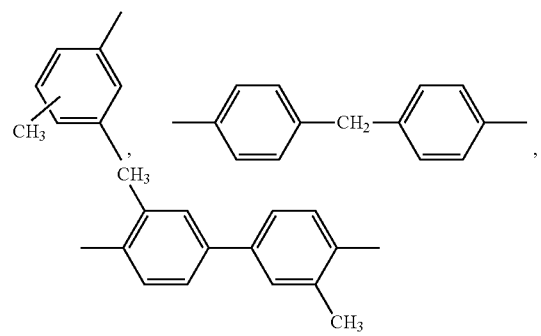

Specifically, the compounds of the following formulas (1-1) and (1-6) can be listed as the urea compounds that can be used. In particular, the urea compound of formula (1-1) or (1-5) is preferable.

[Chemical 2]

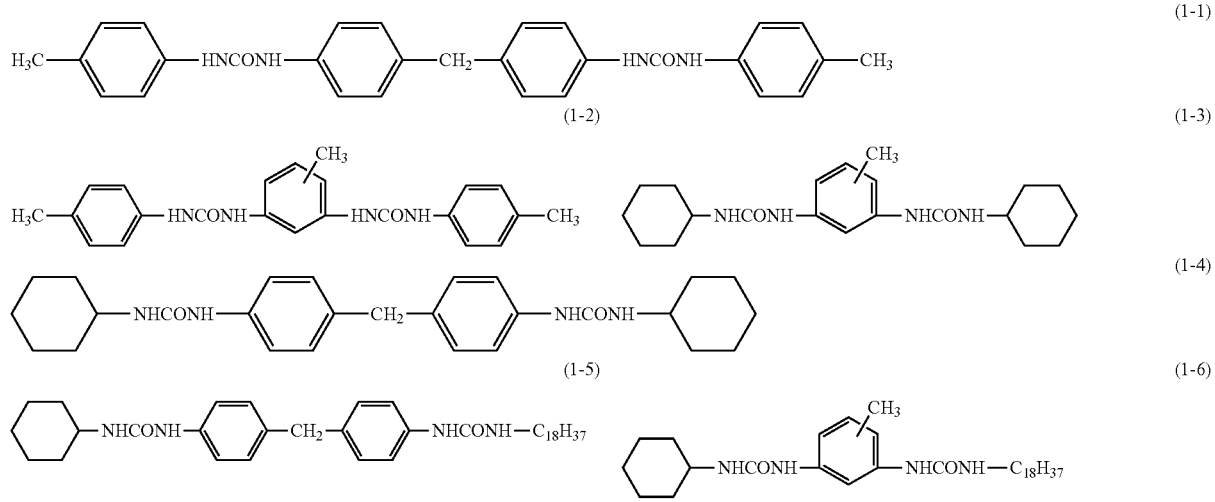

In the composition of the invention the content of the diurea compound is not particularly limited. Preferably, the diurea compound may be contained in such an amount that is required to adjust the worked penetration of the resultant composition of the invention to 235 to 325, more preferably 280 to 325. Thus, the diurea compound may preferably be contained in an amount of 2 to 35 mass %, more preferably 5 to 25 mass %, based on the total mass of the composition. The urea thickener used in the invention can be obtained by reacting a monoamine with a diisocyanate at 10 to 200° C., for example. The method for the above-mentioned reaction is not particularly limited, and any conventional methods can be used for production. In this case, volatile solvents may be used, but when a base oil is used as the solvent, the base oil may advantageously be incorporated into the resultant composition of the invention.

Specific examples of the diisocyanate that can be used include aromatic diisocyanate compounds such as 2,4-tolylene diisocyanate, 2,6-tolylene diisocyanate, diphenyl-methane-4,4'-diisocyanate, naphthylene-1,5-diisocyanate and the like, and the mixtures thereof. Examples of the monoamine include aromatic amine compounds such as aniline, benzylamine, toluidine, chloroaniline, and the like. The above-mentioned urea thickener has a film-forming ability, which can improve the life (flaking) and the anti-fretting properties. Unlike the metallic soap thickener, the urea thickener does not act to promote oxidation of the base oil, so that the urea thickener can extend the oxidation life (i.e., lubrication life).

(c) Additives

If desired, the grease composition of the invention may further comprise additives, such as a rust inhibitor, antioxidant, extreme pressure agent, oiliness improver, metal deactivator and the like to further enhance various properties, which additives may be used alone or in combination. The contents of those additives are not particularly limited so long as the effects of the invention may not be impaired, but usually may be within the range of 0.1 to 20 mass % based on the total mass of the grease composition. When the contents of other additives are less than 0.1 mass %, the effects will be insufficient even after the addition. When the contents of other additives exceed 20 mass %, the resultant effects will be saturated and the lubricating properties may unfavorably be lowered because the content of base oil is relatively decreased.

[Rust Inhibitor]

Incorporation of the rust inhibitor can provide a grease composition capable of preventing or reducing rust even when in contact with water. For example, carboxylic acids and derivatives thereof, and sulfonates may preferably be used as the rust inhibitors.

In consideration of the effect and economy, the content of the rust inhibitor may usually be 0.05 to 5 mass %, preferably 0.10 to 4 mass %, and more preferably 0.25 to 3 mass %, based on the total mass of the grease composition of the invention.

[Antioxidant]

The antioxidant is known as an oxidative degradation inhibitor for grease. The antioxidant that can be used in the invention includes phenol type antioxidants and amine type antioxidants. Examples of the phenol type antioxidants include 2,6-di-t-butyl-p-cresol (BHT), 2,2'-methylenebis(4-methyl-6-t-butylphenol), 4,4'-butylidenebis(3-methyl-6-t-butyl-phenol), 2,6-di-t-butyl-phenol, 2,4-dimethyl-6-t-butyl-phenol, t-butylhydroxyanisole (BHA), 4,4'-butylidenebis (3-methyl-6-t-butylphenol), 4,4'-methylenebis(2,3-di-t-butylphenol), 4,4'-thiobis(3-methyl-6-t-butylphenol) and the like. Examples of the amine type antioxidants include N-n-butyl-p-aminophenol, 4,4'-tetramethyl-di-aminodiphenyl-methane, α-naphthylamine, N-phenyl-α-naphthylamine, phenothiazine and the like.

In consideration of the effect and economy, the content of the antioxidant may usually be 0.1 to 5 mass %, preferably 0.5 to 4 mass %, and more preferably 1 to 3 mass %, based on the total mass of the grease composition of the invention.

[Oiliness Improver]

The oiliness improver may be further added to the grease composition. The oiliness improver that can be used in the invention include higher fatty acids, higher alcohols, fats and oils, and the like.

[Preparation Method]

The method for preparing the composition of the invention is not particularly limited, but various methods are usable. To be more specific, the components are added to a base oil simultaneously or consecutively, and the resultant mixture is kneaded using a roll mill or the like to prepare a composition. Alternatively, an additive composition may be prepared in advance so that the concentration may be 5 to 10 times that in the final composition according to the invention, and then the additive composition is mixed with a base oil, thereby obtaining a composition of the invention.

[Bearing]

The invention is intended for hub unit bearings employing a variety of seal materials such as acrylic rubber (ACM), chloroprene rubber (CR), nitrile rubber (NBR), hydrogenated nitrile rubber (HNBR), urethane rubber (U), silicone rubber (VMQ), fluororubber (FKM) and the like. For example, the hub unit bearings for car vehicles are target ones.

EXAMPLES

To prepare grease compositions according to Examples and Comparative Examples, the predetermined amounts of raw material isocyanate and amine were allowed to react at a molar ratio of 1 to 2 in each base oil as shown in Tables 1 to 4. After given amounts of additives were added, the resultant mixture was adjusted to have a predetermined consistency using a three-roll mill.

For the base oil, a poly α-olefin and a polyol ester were mixed at a ratio as indicated. As the polyol ester, an ester of pentaerythritol with a straight or branched chain fatty acid having 7 to 10 carbon atoms, or an ester of dipentaerythritol with a straight or branched chain fatty acid having 7 to 10 carbon atoms was used. The mixing ratio (unit: parts by mass) for preparation of the base oil is as shown in Tables 1 to 4. The kinematic viscosities (mm²/s) of the base oils at 40° C. are shown in Tables 1 to 4.

For the thickener, an aromatic diurea prepared by the reaction of 4,4'-diphenylmethanediisocyanate with p-toluidine, or an alicyclic aliphatic diurea prepared by the reaction of 4,4'-diphenylmethanediisocyanate with cyclohexylamine and stearylamine was used. In the above-mentioned alicyclic aliphatic diurea compound, the molar ratio of cyclohexylamine to stearylamine was 7:1. The contents of the thickeners (unit: mass % based on the total mass of the grease composition) are as shown in Tables 1 to 4.

Furthermore, to each composition, alkyldiphenylamine was added as the antioxidant in an amount of 1 mass %, and an amine type rust inhibitor was added in an amount of 0.30 mass %. The rest was compensated with the base oil. All the grease compositions were adjusted to have a worked penetration of 325 (when determined in accordance the JIS K2220.

<Evaluation Methods and Judgment>
Sealing Stability
Seal material immersion test
Evaluation Conditions:
 Test temperature: 100° C.
 Test duration: 70 hours
 Seal material: NBR
Evaluation Method:
 The seal material of NBR was thoroughly immersed into each grease composition and left at 100° C. for 70 hours. Then, the seal material was taken out and the volume swell thereof was determined.
Judgment:
 less than 10%: oo (acceptable)
 10% or more and less than 15%: o (acceptable)
 15% or more: x (not acceptable)
Low Torque Characteristics
Rheometer test
Evaluation Conditions:
 Shear rate: 1 to $10^4$ $s^{-1}$
 Test temperature: 25° C.
 Distance between plates: 1.0 mm
 Plate diameter: 25 mm
Evaluation Method:
 The average of the shear stress at the shear rates (1 to $10^4$ $s^{-1}$) was determined and the average values thus obtained were regarded as the results of determination.
Judgment:
 Shear stress of less than 1500 Pa: oo (acceptable)
 1500 Pa or more and less than 2000 Pa: o (acceptable)
 2000 Pa or more: x (not acceptable)
High-Temperature Durability
Bearing lubrication life test (in accordance with ASTM D3336)
Evaluation Conditions:
 Bearing type: 6204 metal sealed bearing
 Testing temperature: 140° C.
 The number of revolutions: 10,000 rpm
 Amount of grease: 1.8 g
 Test loads: axial load 66.7 N
 radial load 66.7 N
Evaluation Method:
 The life was regarded as time duration until the motor caused overcurrent (4 A) or the bearing temperature increased by 15° C. after initiation of the test.
Judgment:
 Bearing lubrication life of 1500 h or more: oo (acceptable)
 1000 h or more and less than 1500 h: o (acceptable)
 less than 1000 h: x (not acceptable)

TABLE 1

|  |  | Ex. 1 | Ex. 2 | Ex. 3 | Ex. 4 | Ex. 5 | Ex. 6 |
|---|---|---|---|---|---|---|---|
| (a) Thickener | Type | Aromatic diurea | Aromatic diurea | Aromatic diurea | Aromatic diurea | Aromatic diurea | Aromatic diurea |
|  | Content | 18.5 | 18.5 | 18.5 | 18.5 | 18.5 | 18.5 |
| (b) Base oil | Type | Poly α-olefin | | | | | |
|  | Mixing ratio | 80 | 70 | 60 | 50 | 50 | 50 |
|  | Type | Polyol ester | | | | | |
|  | Mixing ratio | 20 | 30 | 40 | 50 | 50 | 50 |
|  | Kinematic viscosity at 40° C. | 60 | 60 | 60 | 60 | 30 | 80 |

TABLE 1-continued

|  | Ex. 1 | Ex. 2 | Ex. 3 | Ex. 4 | Ex. 5 | Ex. 6 |
|---|---|---|---|---|---|---|
| Worked penetration | 325 | 325 | 325 | 325 | 325 | 325 |
| Sealing stability | oo | oo | oo | oo | o | oo |
| Low torque characteristics | oo | oo | oo | oo | oo | o |
| High temp. durability | oo | oo | oo | oo | o | oo |

TABLE 2

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| (a) Thickener | Type | Aromatic diurea | Aromatic diurea | Aromatic diurea | Aromatic diurea | Aromatic diurea | Aromatic diurea |
| | Content | 18.5 | 18.5 | 18.5 | 18.5 | 18.5 | 18.5 |
| (b) Base Oil | Type | Poly α-olefin | | | | | |
| | Mixing ratio | — | 40 | 100 | 90 | 50 | 50 |
| | Type | Polyol ester | | | | | |
| | Mixing ratio | 100 | 60 | — | 10 | 50 | 50 |
| | Kinematic viscosity at 40° C. | 60 | 60 | 60 | 60 | 15 | 100 |
| | Worked penetration | 325 | 325 | 325 | 325 | 325 | 325 |
| | Sealing stability | x | x | oo | oo | x | oo |
| | Low torque characteristics | oo | oo | oo | oo | x | x |
| | High temp. durability | oo | oo | x | x | x | oo |

In Examples 1 to 6, each grease composition comprises a mixed base oil containing a poly α-olefin and a pentaerythritol ester or dipentaerythritol ester and having a kinematic viscosity at 40° C. within the specified range, and an aromatic diurea thickener, so that the sealing stability, low torque characteristics and high-temperature durability (i.e., bearing lubrication life) are all excellent.

In contrast to this, the results of the sealing stability were unacceptable due to considerable swelling of the seal material in Comparative Example 1 using the base oil of 100 parts by mass of the polyol ester, and also in Comparative Example 2 using the base oil containing 40 parts by mass of the poly α-olefin.

The results of the bearing life were unacceptable because of the insufficient heat resistance in Comparative Example 3 using the base oil of 100 parts by mass of the poly α-olefin, and also in Comparative Example 4 using the base oil containing 10 parts by mass of the polyol ester.

The seal material was caused to swell in Comparative Example 5 where the kinematic viscosity of the base oil at 40° C. was as low as 15 mm²/s although the poly α-olefin and the polyol ester were both contained in the base oil. In addition, the resultant oil film was so thin that the bearing life was unacceptable.

The result of the torque test was unacceptable in Comparative Example 6 where the kinematic viscosity of the base oil at 40° C. was as high as 100 mm²/s although the poly α-olefin and the polyol ester were both contained in the base oil.

As can be seen from Tables 1 and 2, the grease compositions of Examples 1, 2, 3, 4, 5 and 6 are more suitable for the automotive hub unit bearing than the grease compositions of Comparative Example 1, 2, 3, 4, 5 and 6 because of the excellent sealing stability, low torque characteristics and bearing lubrication life.

TABLE 3

| | | Ex. 6 | Ex. 7 | Ex. 8 | Ex. 9 | Ex. 10 | Ex. 11 |
|---|---|---|---|---|---|---|---|
| (a) Thickener | Type | Alicyclic aliphatic diurea | Alicyclic aliphatic diurea | Alicyclic aliphatic diurea | Alicyclic aliphatic diurea | Alicyclic aliphatic diurea | Alicyclic aliphatic diurea |
| | Content | 9.5 | 9.5 | 9.5 | 9.5 | 9.5 | 9.5 |
| (b) Base oil | Type | Poly α-olefin | | | | | |
| | Mixing ratio | 80 | 70 | 60 | 50 | 50 | 50 |
| | Type | Polyol ester | | | | | |
| | Mixing ratio | 20 | 30 | 40 | 50 | 50 | 50 |

TABLE 3-continued

|  | Ex. 6 | Ex. 7 | Ex. 8 | Ex. 9 | Ex. 10 | Ex. 11 |
|---|---|---|---|---|---|---|
| Kinematic viscosity at 40° C. | 60 | 60 | 60 | 60 | 30 | 80 |
| Worked penetration | 325 | 325 | 325 | 325 | 325 | 325 |
| Sealing stability | oo | oo | oo | oo | o | oo |
| Low torque characteristics | oo | oo | oo | oo | oo | o |
| High temp. durability | oo | oo | oo | oo | o | oo |

TABLE 4

|  |  | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|
| (a) Thickener | Type | Alicyclic aliphatic diurea | Alicyclic aliphatic diurea | Alicyclic aliphatic diurea | Alicyclic aliphatic diurea | Alicyclic aliphatic diurea | Alicyclic aliphatic diurea |
|  | Content | 9.5 | 9.5 | 9.5 | 9.5 | 9.5 | 9.5 |
| (b) Base oil | Type | | | Poly α-olefin | | | |
|  | Mixing ratio | — | 40 | 100 | 90 | 50 | 50 |
|  | Type | | | Polyol ester | | | |
|  | Mixing ratio | 100 | 60 | — | 10 | 50 | 50 |
|  | Kinematic viscosity at 40° C. | 60 | 60 | 60 | 60 | 15 | 100 |
|  | Worked penetration | 325 | 325 | 325 | 325 | 325 | 325 |
| Sealing stability |  | x | x | oo | oo | x | oo |
| Low torque characteristics |  | oo | oo | oo | oo | x | x |
| High temp. durability |  | oo | oo | x | x | x | oo |

In Examples 6 to 11, each grease composition comprises a mixed base oil containing a poly α-olefin and a pentaerythritol ester or dipentaerythritol ester and having a kinematic viscosity at 40° C. within the specified range, and an alicyclic aliphatic diurea thickener, so that the sealing stability, low torque characteristics and bearing lubrication life are all excellent.

In contrast to this, the results of the sealing stability were unacceptable due to considerable swelling of the seal material in Comparative Example 7 using the base oil of 100 parts by mass of the polyol ester, and also in Comparative Example 8 using the base oil containing 40 parts by mass of the poly α-olefin.

The results of the bearing life were unacceptable because of the insufficient heat resistance in Comparative Example 9 using the base oil of 100 parts by mass of the poly α-olefin, and also in Comparative Example 10 using the base oil containing 10 parts by mass of the polyol ester.

The seal material was caused to swell in Comparative Example 11 where the kinematic viscosity of the base oil at 40° C. was as low as 15 mm²/s although the poly α-olefin and the polyol ester were both contained in the base oil. In addition, the resultant oil film was so thin that the bearing life was unacceptable.

The result of the torque test was unacceptable in Comparative Example 12 where the kinematic viscosity of the base oil at 40° C. was as high as 100 mm²/s although the poly α-olefin and the polyol ester were both contained in the base oil.

As can be seen from Tables 3 and 4, the grease compositions of Examples 6, 7, 8, 9, 10 and 11 are more suitable for the automotive hub unit bearing than the grease compositions of Comparative Examples 7, 8, 9, 10, 11 and 12 because of the excellent sealing stability, low torque characteristics and bearing lubrication life.

The invention claimed is:

1. A grease composition for hub unit bearing, comprising;
   (a) as a base oil a mixture of a hydrocarbon synthetic oil and an ester type synthetic oil, with the content of the ester type synthetic oil being 20 to 50 parts by mass with respect to 100 parts by mass of the total of the hydrocarbon synthetic oil and the ester type synthetic oil, and the base oil having a kinematic viscosity at 40° C. of 30 to 80 mm²/s,
   (b) as a thickener at least one urea compound selected from the group consisting of the compounds represented by the following formulae:

(1-5)

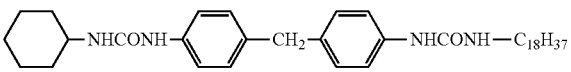

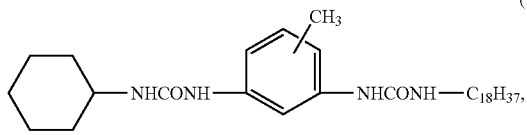 (1-6)

and (c) an additive wherein the total content of the mixture of the hydrocarbon synthetic oil and the ester type synthetic oil in the base oil is 100 mass %, wherein the hydrocarbon synthetic oil is a poly α-olefin and the ester type synthetic oil is an ester of trimethylolpropane, pentaerythritol or dipentaerythritol with an aliphatic straight or branched chain monocarboxylic acid having 2 to 36 carbon atoms, wherein the content of the thickener in the grease composition is 5 to 25 mass %, and wherein the content of the additive in the grease composition is 0.1 to 20 mass %.

2. The grease composition of claim 1, wherein the ester type synthetic oil is an ester of pentaerythritol with a straight or branched chain fatty acid having 7 to 10 carbon atoms, or an ester of dipentaerythritol with a straight or branched chain fatty acid having 7 to 10 carbon atoms.

3. The grease composition of claim 1, wherein a worked penetration of the grease composition is 280 to 325 when determined in accordance with JIS K2220.

4. The grease composition of claim 1, wherein the additive comprises at least one rust inhibitor selected from the group consisting of carboxylic acids, derivatives thereof, and sulfonates.

5. The grease composition of claim 4, wherein the content of the rust inhibitor in the grease composition is 0.25 to 3 mass %.

6. The grease composition of claim 1, wherein the additive comprises an antioxidant having an amine functional group.

7. The grease composition of claim 6, wherein the content of the antioxidant in the grease composition is 1 to 3 mass %.

8. The grease composition of claim 1, wherein the additive comprises an extreme pressure agent.

9. The grease composition of claim 1, wherein the ester type synthetic oil is an ester of dipentaerythritol with a straight or branched chain fatty acid having 7 to 10 carbon atoms.

* * * * *